(12) United States Patent
Lefebvre et al.

(10) Patent No.: US 9,040,768 B2
(45) Date of Patent: May 26, 2015

(54) METHOD FOR LIMITING THE DEGASSING OF TRITIATED WASTE ISSUED FROM THE NUCLEAR INDUSTRY

(71) Applicant: COMMISSARIAT A L'ENERGIE ATOMIQUE ET AUX ENERGIES ALTERNATIVES, Paris (FR)

(72) Inventors: Xavier Lefebvre, Pertuis (FR); Karine Liger, Pertuis (FR); Michele Troulay, Aix en Provence (FR)

(*) Notice: Subject to any disclaimer, the term of this patent is extended or adjusted under 35 U.S.C. 154(b) by 202 days.

(21) Appl. No.: 13/710,985

(22) Filed: Dec. 11, 2012

(65) Prior Publication Data

US 2013/0178686 A1 Jul. 11, 2013

(30) Foreign Application Priority Data

Dec. 12, 2011 (FR) ..................... 11 61500

(51) Int. Cl.
| | |
|---|---|
| G21F 9/16 | (2006.01) |
| G21F 9/22 | (2006.01) |
| G21F 9/02 | (2006.01) |
| G21F 9/04 | (2006.01) |
| G21F 9/06 | (2006.01) |
| G21F 9/12 | (2006.01) |
| G21F 9/30 | (2006.01) |
| B01J 8/00 | (2006.01) |
| G21B 1/11 | (2006.01) |

(52) U.S. Cl.
CPC .. G21F 9/22 (2013.01); G21F 9/02 (2013.01); G21F 9/04 (2013.01); G21F 9/06 (2013.01); G21F 9/12 (2013.01); G21F 9/30 (2013.01); B01J 8/006 (2013.01); G21B 1/115 (2013.01); Y10S 588/901 (2013.01)

(58) Field of Classification Search
USPC .......................... 588/2, 15, 13, 313, 412, 901
See application file for complete search history.

(56) References Cited

U.S. PATENT DOCUMENTS

| | | | |
|---|---|---|---|
| 4,224,384 A | 9/1980 | Kozawa et al. | |
| 4,252,666 A | 2/1981 | Kozawa et al. | |
| 5,464,988 A | 11/1995 | Rossmassler et al. | |
| 6,994,831 B1 | 2/2006 | Gentile et al. | |
| 8,821,824 B2 * | 9/2014 | Ghirelli et al. | ................ 423/249 |

FOREIGN PATENT DOCUMENTS

| | | |
|---|---|---|
| DE | 3606317 | 9/1987 |
| EP | 0240985 | 10/1987 |
| EP | 1752206 | 2/2007 |
| WO | WO 9101175 | 2/1991 |
| WO | WO 2006064289 | 6/2006 |
| WO | WO 2008071716 | 6/2008 |

* cited by examiner

*Primary Examiner* — Edward Johnson
(74) *Attorney, Agent, or Firm* — The Farrell Law Firm, P.C.

(57) ABSTRACT

A method and device for limiting the degassing of tritiated waste issued from the nuclear industry are provided. The method reduces an amount of generated tritiated hydrogen ($T_2$ or HT) and/or tritiated water (HTO or $T_2O$) including at least one piece of tritiated waste from the nuclear industry. The method includes placing the package in contact with a mixture including manganese dioxide ($MnO_2$) combined with a component that includes silver; and placing the package in contact with a molecular sieve.

22 Claims, 4 Drawing Sheets

METHOD FOR LIMITING THE DEGASSING OF TRITIATED WASTE ISSUED FROM THE NUCLEAR INDUSTRY

PRIORITY

This application claims priority under 35 U.S.C. §119(a) to a French Patent Application filed Dec. 12, 2011, and assigned Serial No. FR.11/61500, the entire disclosure of which is incorporated herein by reference.

BACKGROUND OF THE INVENTION

1. Field of the Invention

The present invention concerns a method and device for processing waste issuing from the nuclear industry. It relates more particularly to a method and device for limiting the degassing of tritiated waste produced by nuclear reactions.

2. Description of the Related Art

Tritium (T or $^3$H) may be present in several types of nuclear reactor. In the majority of fission reactors, it may for example be produced by the ternary fission of uranium (U) and plutonium (Pu) as well as in neutron reactions between boron (B) and lithium (Li). In addition, in fusion reactors, tritium is used as a fuel. That is the case of Joint European Torus (JET) reactors, for International Thermonuclear Experimental Reactors (ITER) and (Demonstration Power Plant (DEMO reactors) designed to succeed the ITER reactor. In these reactors, the fusion reaction from deuterium (D or $^2$H) and tritium (T or $^3$H) is governed by Equation (1):

$$D+T \rightarrow {}_4^2He + {}_0^1n + 17.6 \text{ MeV} \quad (1)$$

One of the properties of tritium, just like the other isotopes of hydrogen, is its ability to penetrate through materials, which contaminates them. This property makes tritiated waste very specific since both the radioactive elements and the degassing must be taken into account in the management of the waste. Moreover, tritium may be present in two gaseous forms, tritiated hydrogen (HT or $T_2$) and tritiated water (HTO or $T_2O$). It should be noted that tritiated hydrogen (HT or $T_2$) is much more mobile than tritiated water (HTO or $T_2O$), even in vapour form. Tritiated hydrogen (HT or $T_2$) also has a very small size. Its great mobility and its small size promote its diffusion even through the finest porosities, passing for example through rubber and diffusing in the majority of types of steel and concrete. Trapping tritiated hydrogen (HT or $T_2$) is therefore made particularly complex.

With the development of fusion reactors, the quantity of tritiated waste will thus increase significantly. There consequently exists a particularly great need consisting of sizing an effective method of detritiation and limitation of degassing, in particular at ambient temperature and atmospheric pressure. The reduction in the quantity of tritiated hydrogen produced by a package of waste must be sufficiently effective to satisfy the existing acceptability criteria of warehousing and storage centres, so that these packages comprising tritiated waste can be included in the existing warehousing and storage centres.

One solution has been proposed and is described in U.S. Pat. No. 5,464,988. This patent proposes a device for storing and transporting tritiated water contained in a gas. The device comprises an external drum and an internal drum placed inside the external drum. Inside the internal drum is a disposable molecular sieve intended to be loaded with tritium. The device also comprises entry and exit diffusers as well as a catalytic hydrogen recombiner. A protective and thermal insulation material is arranged in each space available between the two drums. The catalytic hydrogen recombiner converts the tritiated hydrogen into tritiated water, which can then be trapped by the molecular sieve in solid form with a view to storage and transportation thereof.

This device affords a solution for trapping tritiated water in gaseous form. Trapping tritiated hydrogen (HT or $T_2$) does however prove to be more complicated because of the smaller size and greater mobility of this gas compared with tritiated water in gaseous form. In addition, this solution is based on a particularly complex drum requiring numerous specific items of equipment that require specific maintenance. For example, the use of a catalytic recombiner requires a heating device and therefore maintenance of the system. In addition, human intervention is necessary for regularly changing the molecular sieve saturated with tritiated water.

The complexity of this solution tends to make its cost relatively high and its reliability limited.

There therefore exists a need consisting of proposing a simple and effective solution for limitation of the degassing of tritiated hydrogen ($T_2$ or HT) and tritiated water (HTO or $T_2O$), this solution also having to make it possible to reduce the maintenance and human intervention requirements. The solution must also be effective over several hundreds of years.

The objective of the present invention is to describe such a solution.

SUMMARY OF THE INVENTION

In the remainder of the disclosure of the invention tritiated water will be spoken of indifferently, which designates the elements HTO and $T_2O$. In the present description, tritiated water designates tritiated water in vapour or liquid form.

The present invention provides a method for reducing the quantity of tritiated hydrogen ($T_2$ or HT) and/or tritiated water (HTO or $T_2O$) generated by at least one package comprising at least one piece of waste. The method includes placing the package in contact with a mixture comprising manganese dioxide ($MnO_2$) combined with a component comprising silver, and then a step of placing the package in contact with a molecular sieve.

The mixture can effectively oxidize the tritiated hydrogen ($T_2$ or HT), in order to reduce the diffusivity of this gas. The result is tritiated water ($T_2O$ or HTO), tritiated water being much less mobile than tritiated hydrogen. The tritiated water is then trapped by the molecular sieve. It has proved that the combination of the molecular sieve with the mixture comprising manganese dioxide associated with silver reduces the degassing of tritiated waste very effectively and safely even for small quantities of tritiated hydrogen. In particular, the combination of the method according to the invention provides high kinetics and great reactivity compared to tritiated hydrogen. In addition, this method of trapping tritiated hydrogen does not require any external maintenance. Particularly advantageously, it may be carried out at ambient pressure and temperature. Moreover, the reaction generates a thermally stable product. It is also reversible with difficulty or not at all over at least several hundreds of years. Advantageously, the trapping method proposed by the invention is relatively simple to implement and inexpensive. The present invention is therefore particularly relevant for use on an industrial scale.

In the context of the present invention, tritiated waste means any radioactive waste liable to contain or degas tritiated hydrogen (HT or $T_2$). The waste may also contain tritium in other forms such as for example tritiated water (HT or $T_2O$). Typically, the waste issues from the nuclear industry and is liable to contain or degas tritiated hydrogen and/or tritiated water.

In the context of the present invention, putting at least two elements, typically tritiated hydrogen or tritiated water, in contact with the mixture comprising manganese dioxide ($MnO_2$) combined with a component comprising silver and/or with the molecular sieve means that these elements are placed so as to be able to react with one another. This putting in contact may therefore be a physical contact of two elements in the solid, liquid or gas state. In any event, a putting in contact enables the elements to interact so that the reaction of transformation of the tritiated hydrogen into tritiated water and the reaction of trapping the tritiated water by the molecular sieve take place.

Optionally, the method according to the invention can have at least any one of the optional steps and features stated below.

The present invention provides a package including at least one piece of waste generated by a nuclear fission reaction. Alternatively or cumulatively, the package may comprise at least one piece of waste formed by a spent fuel or one to be used for a nuclear fusion reaction. The package may also comprise a piece of waste made tritiated by the presence of another piece of tritiated waste or by the presence of a tritiated fuel. The waste may also be the product or fuel of a nuclear reaction. It may also be any element contaminated by the product or fuel of a nuclear reaction. The waste may thus be an object made radioactive such as a garment or a tool, reactor parts, radioactive fuel, etc.

The component comprising silver comprises at least one of the following components: $AgO$, $Ag_2O$, silver salts of the $AgCl$ or $AgNO_3$ type, or complexes comprising silver.

Preferentially, the silver is in silver oxide form (Ago or $Ag_2O$) in the mixture. The mass concentration of manganese dioxide in the mixture is ranging from 80% to 99% and the mass concentration of silver oxide $Ag_2O$ in the mixture is ranging from 20% to 1%. This corresponds to a mass fraction of silver (Ag) of between 0.93% and 18.6%. This is because 10% $Ag_2O$ corresponds to 9.3% silver (Ag).

More precisely, the mass concentration of manganese dioxide in the mixture is ranging from 87% to 93% and the mass concentration of silver oxide $Ag_2O$ in the mixture is ranging from 13% to 7%. Even more preferentially, the mass concentrations in the mixture for manganese dioxide and silver oxide $Ag_2O$ are around 90% and 10%, respectively.

Preferably, the silver is in the silver nitrate form ($AgNO_3$) and the mass fraction of silver (Ag) in the mixture is ranging from 1.5% to 30% and preferably around 15%.

According to a particular embodiment, the mixture comprises platinum (Pt) or a compound containing platinum. For reasons of clarity, in the remainder of the present description this compound containing platinum will be referred to as a "platinum compound".

Advantageously, it is platinum black 10% Pt. As is known, platinum black 10% Pt is composed of 90% active carbon and 10% platinum.

Platinum accelerates and facilitates the oxidation of tritiated hydrogen.

Advantageously, the mass concentration of the platinum compound in the mixture is ranging from 0.1% to 1%, that is to say a proportion of platinum ranging from 0.01% to 0.1% for platinum black 10% Pt. Preferably, this concentration is 0.5% Pt black 10%, that is to say 0.05% platinum, the manganese dioxide concentration is 89.3% and the silver oxide $Ag_2O$ concentration is 10.2%. More precisely, these concentrations are 0.56%, 89.28% and 10.16%, respectively.

According to a particular embodiment, the mixture comprises solely manganese dioxide and silver oxide. According to another embodiment, the mixture comprises solely manganese dioxide, silver oxide and platinum compound.

Preferentially, the molecular sieve is a 4A-type or 5A-type zeolite.

Preferably the method comprises, prior to the steps of putting the package in contact with the mixture and putting the package in contact with at least one molecular sieve, a step of depositing the mixture on the molecular sieve. According to an advantageous embodiment, the step of depositing the mixture on the molecular sieve is accompanied by a step of mechanical fixing of the mixture on the molecular sieve. According to another advantageous embodiment, the step of depositing the mixture on the molecular sieve is accompanied by a step of chemical fixing of the mixture on the molecular sieve by means of a binder, such as for example water. In this case, the fixing step consists of putting the mixture and the molecular sieve in contact in aqueous phase followed by a step of drying at a temperature ranging from 150° to 200° C. for a period of between 12 h and 48 h.

According to an embodiment in which the mixture is fixed to the molecular sieve, the package is in the form of a drum having a bottom and able to contain at least one piece of tritiated waste, the method comprising a step of placing, in the bottom of the drum, the sieve to which the mixture is fixed.

According to an embodiment in which the mixture is not fixed to the molecular sieve, the package is in the form of a drum having a bottom and containing at least one piece of tritiated waste, the method comprising a step of placing the sieve in the bottom of the drum and a step of placing the mixture in the waste or on the waste.

The sieve and the mixture can also be placed in a drum already completely or partially filled.

According to yet another embodiment the mixture is placed on a metal mesh to form a covering, the method also comprising a step of enveloping at least one part of the package with the covering. Preferably, the metal mesh is flexible to enable the cover to match the shapes of the package. Preferably, the cover incorporates the molecular sieve, the latter being covered by the mixture. This embodiment is particularly advantageous when the package is in the form of waste coated in a matrix, such as cement, glass or bitumen matrix.

The method comprises, prior to the step of putting the package in contact with a mixture of manganese dioxide ($MnO_2$) combined with silver (Ag), a step of preparing the mixture during which the manganese dioxide ($MnO_2$) is combined with a compound comprising silver such as for example a silver oxide or a silver salt, these examples not being limitative.

Preferentially, during the step of preparing the mixture, the silver is added in the form of silver oxide (AgO or $Ag_2O$) to the manganese dioxide ($MnO_2$).

According to a first embodiment, the step of preparing the mixture comprises a step of mixing a manganese dioxide powder with a silver oxide powder (AgO or $Ag_2O$). Optionally, the method comprises, during the step of preparing the mixture and after the step of mixing the manganese dioxide powder with the silver oxide powder, a step of adding water to the mixed powders. The addition of water has the advantage of facilitating the spreading of the silver on the surface of the manganese dioxide.

According to a second embodiment, the step of preparing the mixture comprises a step spreading a saline solution comprising silver ions ($Ag^+$) on manganese dioxide in the solid state. Preferably, the manganese dioxide is in the form of a dusty powder.

According to a third embodiment, the step of preparing the mixture comprises a step of immersing manganese dioxide in the solid state, preferably in a dusty powder form, in a solution comprising a salt or a silver oxide. More precisely, the silver is in the form of a cation $Ag^+$ or $Ag^{2+}$. One advantage of this method is that it is particularly effective for obtaining a homogeneous distribution of the silver on the manganese dioxide.

According to a fourth embodiment, the step of preparing the mixture comprises a step of depositing silver on the manganese dioxide by a precipitation reaction of a solution comprising silver. The advantage of a method of impregnation by a liquid is the homogeneity of the final mixture obtained. The solution comprising silver is a solution of silver salts (AgCl, AgBr, $AgNO_3$, etc.). The precipitation is caused by the introduction of sodium hydroxide (NaOH) in this silver nitrate solution.

According to one embodiment, the package comprises a drum comprising a plurality of pieces of tritiated waste. Alternatively, the package comprises a piece of waste coated in a matrix, the matrix being for example concrete, bitumen or glass.

Another subject matter of the present invention is a device for reducing the quantity of tritiated hydrogen, the device comprising at least one molecular sieve, with the device including a mixture comprising manganese dioxide ($MnO_2$) combined with a compound comprising silver such as for example a silver oxide or a silver salt, these examples not being limitative.

For the reasons mentioned previously in relation to the method, the invention thus proposes a device that is particularly effective for reducing the degassing of tritiated waste with a view to warehousing and storage thereof.

According to an advantageous embodiment, the mixture comprising manganese dioxide ($MnO_2$) combined with a compound comprising silver is fixed to the molecular sieve. Optionally, the layer has a thickness of between 5 and 20 μm. One advantage of this embodiment is enabling a homogeneous spreading of the various constituents, which improves the efficacy of the device. Preferably, the molecular sieve is a 4A-type or 5A-type zeolite. Advantageously, the layer is fixed to the sieve mechanically and/or by means of an additive. This additive is preferably a binder, such as for example water.

According to another advantageous embodiment, the device comprises at least one drum able to contain at least one piece of tritiated waste as well as the sieve and the mixture.

Optionally, the device includes at least one of: a drum containing waste with the mixture spread on the waste or in the middle of the waste; a sieve placed in the bottom of the drum; and the mixture at least partly covers the molecular sieve, the sieve and the mixture forming a single-piece assembly.

According to yet another advantageous embodiment, the device comprises a cover formed by a flexible substrate, preferably a metal mesh, the flexible substrate being at least partly covered by a layer formed by the mixture comprising manganese dioxide ($MnO_2$) combined with a compound comprising silver, the compound being an oxide, salt, complex or the like.

Thus the package may for example be a drum or a matrix enclosing one or more pieces of radioactive waste. It may also take any other form of container.

Advantageously, for each of the three embodiments of the device mentioned above, the mass concentration of manganese dioxide in the mixture is ranging from 80% to 99%, the mass concentration of silver oxide $Ag_2O$ in the mixture is between 20% and 1%. This corresponds to a mass fraction of silver (Ag) ranging from 0.93% to 18.6%. This is because 10% $Ag_2O$ corresponds to 9.3% silver (Ag). Optionally but nevertheless advantageously, the mixture also comprises a platinum compound the mass concentration of which is preferably ranging from 0.1% to 1%. This corresponds to a mass concentration of platinum ranging from 0.01% to 0.1% for platinum black 10% Pt.

BRIEF DESCRIPTION OF THE FIGURES

Other features, aims and advantages of the present invention will emerge from a reading of the following detailed description with regard to the accompanying drawings, given by way of non-limitative examples and in which.

DETAILED DESCRIPTION OF EMBODIMENTS THE INVENTION

Figure 1:
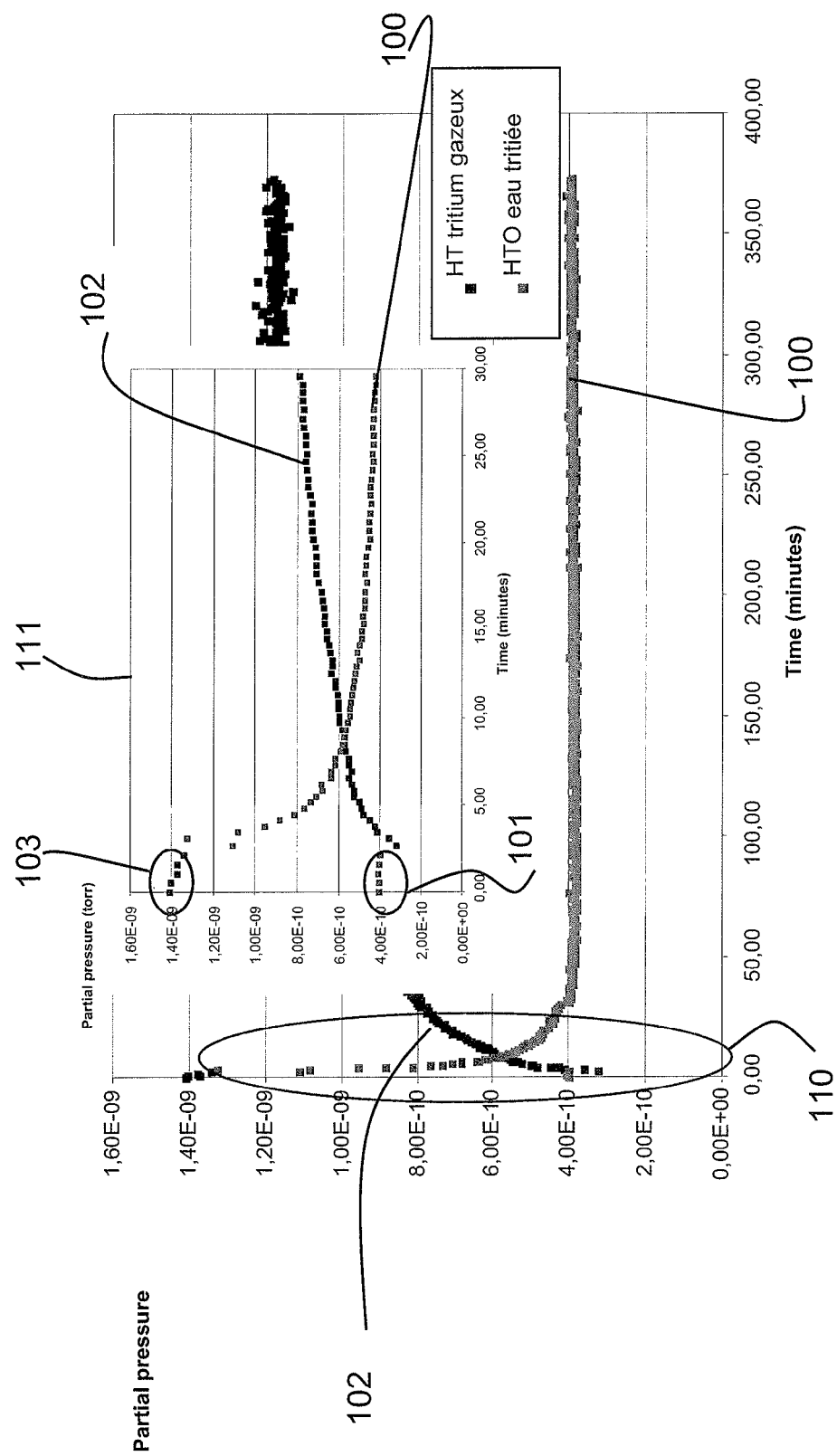
FIG. 1 shows partial pressure curves of tritiated water and tritiated hydrogen as a function of time and for a first example of a method according to the invention.

An example of an implementation method according to the invention will be detailed. Devices for implementing the method will then be described.

In the present patent application, tritiated hydrogen means the gas $T_2$ or HT. Thus tritiated hydrogen differs from tritiated water HTO or $T_2O$, which has a liquid state and a gaseous state. In the latter state, water will be referred to as tritiated water in the gaseous state during the present description.

In the context of the present invention, tritiated hydrogen (HT or $T_2$) is oxidized by a specific metal oxide: manganese dioxide ($MnO_2$).

The reduction of hydrogen and isotopes thereof by manganese dioxide follows Equation (2):

$$MnO_2 + Q_2 \rightarrow MnO + Q_2O \quad (2)$$

where Q represents indifferently all the isotopes of hydrogen.

In order to obtain an effective reduction of the quantity of tritiated hydrogen, it is particularly advantageous to have high kinetics for this reaction. To this end, manganese dioxide is associated with a compound comprising silver. In the context of the present invention, a compound comprising silver promotes the conversion reaction. It may for example be an oxide or a salt without this being limitative. Surprisingly, the combination of silver and manganese atoms procures a synergy effect for catalysing the reduction of tritiated hydrogen by manganese dioxide.

In addition, the use of manganese dioxide makes the reaction particularly safe and inexpensive, which allows industrial application without the provision of external energy and without maintenance.

In the invention, the mixture of silver and manganese oxide is combined with a dehumidifier, typically in the form of a molecular sieve. Advantageously, the molecular sieve is a 4A-type or 5A-type zeolite. Preferably, the package is in contact with a single molecular sieve. The molecular sieve traps the tritiated water. Thus tritiated hydrogen has its mobility reduced when changing in the liquid or gaseous state into tritiated water by virtue of the reaction with the oxide mixture and has its mobility further reduced under the effect of the molecular sieve.

The invention therefore makes it possible to transform tritiated hydrogen into tritiated water, tritiated water that is subsequently trapped by the molecular sieve.

Moreover, the invention has high efficiency even for small quantities of tritiated hydrogen. However, in the context of degassing of tritiated waste, the rate of degassing of tritiated hydrogen is often very low, typically less than 2 GBq/year/kg of waste or $5.6 \cdot 10^{-7}$ g of tritium/year/kg of waste or $1.8 \cdot 10^{-7}$ mol of tritium/year/kg of waste.

The method according to the invention has proved to be particularly effective for treating tritiated waste. Indeed, the method according to the invention has a high reaction kinetics and great reactivity vis-a-vis tritiated hydrogen. In addition, the reactions of the method do not require external maintenance and are not very or not at all reversible, particularly for temperatures below 100° C. Moreover, the reagents such as the products generated by the method are thermally stable.

Several ways of preparing the mixture of manganese and silver oxides can be envisaged.

A first method consists of mechanically mixing the manganese and silver oxides. More precisely, the manganese dioxide and the silver oxide are first of all produced separately, each of them in the form of a powder. The two powders are then mixed. This method has the advantage of being particularly simple to implement.

According to a variant of this first method, water can be added to the manganese dioxide and silver oxide powders. The water is preferentially added in small quantities. This addition of water has the advantage of facilitating the spreading of the silver on the surface of the manganese oxide. Advantageously, 1 ml ($10^{-3}$ l) of water is added for 2.5 g of mixture of oxides. With this proportion of water, very good homogeneity of the deposition of silver oxide is ensured while limiting the time necessary for evaporation.

A second method consists of carrying out impregnation dry. According to this method, a manganese dioxide substrate, preferably in the form of powder or pellets, is wetted with a saline solution including silver ions ($Ag^+$). This saline solution may comprise any silver halide, for example Cl or Br, or silver nitrate. This method is particularly simply to implement.

A third method consists of a diffusional impregnation. According to this method, the manganese dioxide substrate is placed in a solution comprising a salt containing silver ions ($Ag^+$) in excess.

This method is particularly effective for obtaining a homogeneous distribution of silver.

A fourth method is based on the deposition of silver by a precipitation reaction. More precisely, the silver is deposited by precipitation on the manganese using a solution comprising a suspension of manganese oxides and silver nitrate. The precipitation of the silver is obtained by introducing sodium hydroxide (or soda) (NaOH) in the solution.

Preferably, the mixing is carried out so that the manganese dioxide and the silver oxide $Ag_2O$ have mass concentrations ranging from 80% to 90% and ranging from 20% to 1%, respectively, that is to say a mass proportion of silver of between 0.93% and 18.6%. According to a favoured embodiment, the mass concentration of manganese dioxide is around 90% and the mass concentration of silver oxide is around 10%.

FIG. 1 illustrates partial pressure curves of tritiated water (curves 100, 101) and tritiated hydrogen (102, 103) as a function of time according to the method of the invention.

To carry out these experiments, the mass concentrations of manganese dioxide and silver oxide $Ag_2O$ forming the mixture are 90% and 10% respectively. The mass used of mixture is 0.403 g. The molecular sieve has a mass of 11.241 g. It is formed by 5A-type zeolite. The flow rate of gas containing 133 ppmV of tritiated hydrogen, for example generated by tritiated waste, is approximately 750 Normal milliliters per minute (Nml/min).

These curves clearly show the efficiency of the invention in order to reduce the quantity of tritiated hydrogen. The origin of the X axes of the graph corresponds to the moment when the tritiated hydrogen and the mixture of manganese and silver oxides coupled with the molecular sieve are put in contact.

The start of the reaction is indicated by the reference 110 and is presented in enlarged form on the graph 111. During the first two minutes approximately, the partial pressure 103 of tritiated hydrogen is relatively stable around a value close to $1.4 \times 10^{-9}$ torr, which represents 133 volumetric parts per million (Vppm) of tritiated hydrogen. During this same period, the partial pressure of tritiated water 101 is stable at approximately $4.10^{-10}$ torr, which represents an absence of tritiated water.

As soon as the tritiated hydrogen is put in contact with the mixture of oxides combined with the molecular sieve, a fast reduction of the partial pressure of tritiated hydrogen is observed, followed by a huge increase of the partial pressure of tritiated water. This represents the production of tritiated water by reaction of the tritiated hydrogen with the mixture of manganese oxide promoted by the silver.

Almost instantaneously, the partial pressure of tritiated water 100 declines very quickly. After thirty minutes, it reaches once again a partial pressure representing an absence of water. Simultaneously, the partial pressure of tritiated hydrogen 102 increases in order to reach $8.10^{-10}$ torr, corresponding to 75 Vppm after approximately thirty minutes.

The change in these curves reflects the action of the molecular sieve acting as a dehumidifier that traps the tritiated water produced by the reaction of tritiated hydrogen with the mixture of oxides. These curves show that the trapping of the tritiated water takes place more quickly than the production thereof.

The slow increase of the partial pressure of tritiated hydrogen represents the progressive saturation of the mixture of oxides. When the mixture is saturated, the quantity of tritiated hydrogen increases progressively because of the degassing produced by the waste, whereas the quantity of tritiated water for its part remains zero, the oxidation reaction being interrupted because of the lack of reagent.

The calculation of the global yield of the trapping of tritiated hydrogen leads to a reactivity of 23 cm³ of tritiated hydrogen per gram of oxide mixture.

The curve in FIG. 1 thus clearly reflects the efficiency of the method according to the invention even when a small quantity of tritiated hydrogen is present. Advantageously, in the context of the limitation of the degassing of packages of waste, this trapping of tritiated hydrogen is carried out under ambient pressure and temperature, which simplifies its implementation thereof.

To check the limits of the efficiency of the present invention, the tests were carried out under degassing conditions equivalent to the degassing of 9000 highly degassing packages with in addition a very low mixture mass. This explains why the saturation times are low.

Non-limitatively but nevertheless advantageously, this efficiency is further improved by adding platinum (Pt) to the mixture of oxides.

Preferably, a platinum compound is added to the mixture of manganese dioxide and silver oxide in small proportions. Typically, the mass concentration of platinum compound is ranging from 0.1% to 1%.

This corresponds to a mass concentration of platinum ranging from 0.01% to 0.1% for platinum black 10% Pt.

According to a particularly effective example, the platinum black 10% Pt has a mass concentration of 0.56%, the manganese dioxide has a mass concentration of 89.28% and the silver oxide has a mass concentration of 10.16%.

Figure 2:
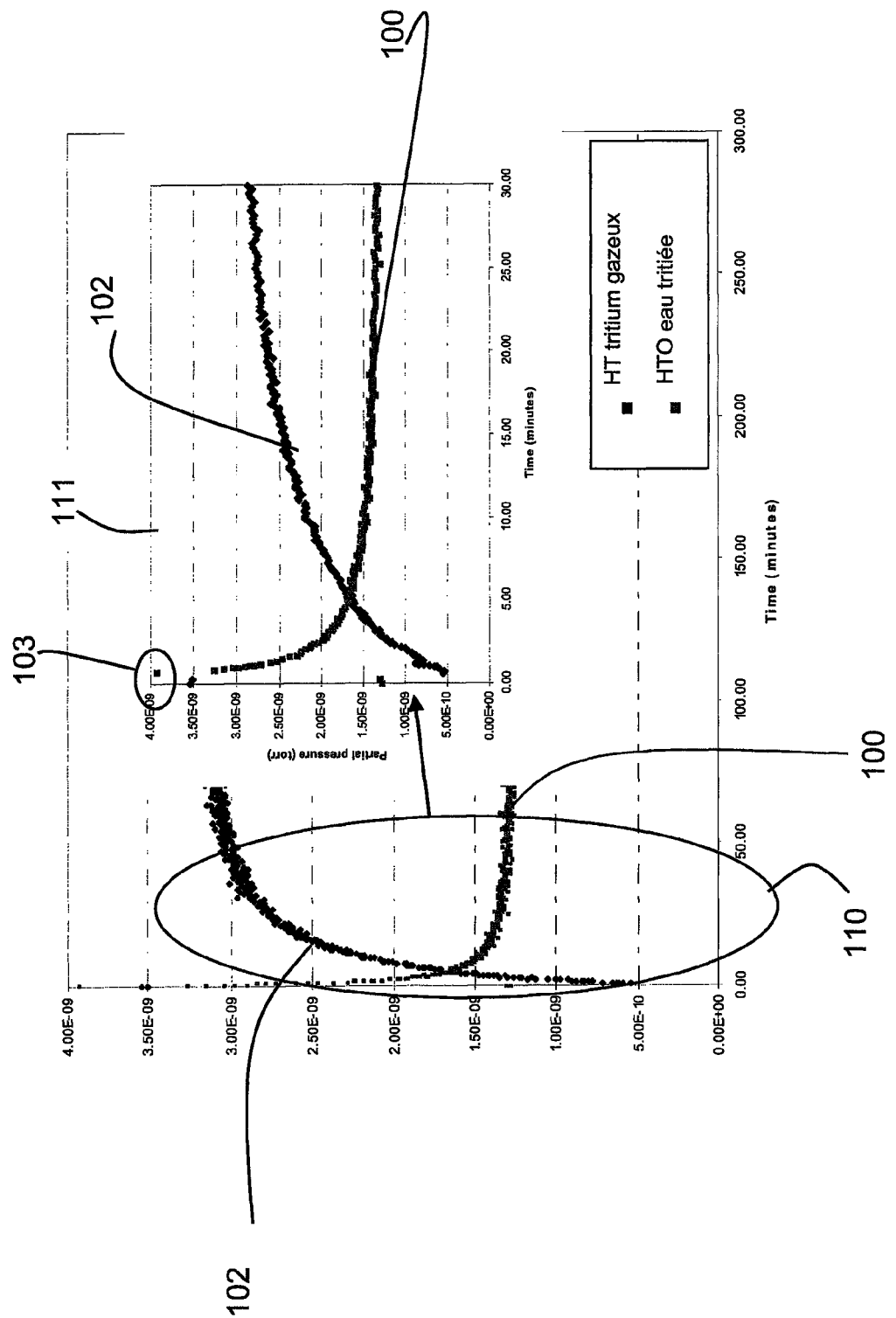
FIG. 2 shows partial pressure curves of tritiated water and tritiated hydrogen as a function of time and in the course of a second example of a method according to the invention in which the mixture of manganese oxide and silver comprises platinum.

FIG. 2 illustrates the results of another example of a method of implementing the invention in which the mixture comprising the manganese dioxide with silver oxide also comprises platinum or a platinum compound. The other conditions for producing these curves are identical to those illustrated in FIG. 1.

To carry out these experiments, the mass concentrations of manganese oxide, silver oxide and platinum in the mixture are 89.5%, 10% and 0.5%, respectively. The mass of mixture used is 0.119 g. The molecular sieve has a mass of 9.202 g. As in the previous example, it is formed by a 5A-type zeolite. The flow rate of gas containing 133 Vppm of tritiated hydrogen is also 750 Nml/min.

As it can be seen on the curves in FIG. 2, the partial pressure 103 of tritiated hydrogen is relatively stable around a value close to $5 \times 10^{-10}$ torr, which represents 12 Vppm of tritiated hydrogen.

Next, the saturation of the reagents occurs rapidly because of the small quantity of oxides. The concentration of tritiated hydrogen reaches 85% of its initial concentration, that is to say 115 Vppm after 30 minutes, and reaches its initial value after 90 minutes. The change in the concentration of tritiated water is similar to that illustrated in FIG. 1.

The calculation of the global yield of the trapping of tritiated hydrogen leads in the second case to a reactivity of 30 $cm^3$ of tritiated hydrogen per gram of oxide mixture. This represents an increase in the yield of 25% in comparison with the method in which the oxide mixture does not include platinum. Introducing platinum into the mixture therefore has a particularly advantageous effect.

As detailed above, the invention is based on the coupling of a molecular sieve with a mixture comprising manganese dioxide and silver oxide. This coupling may appear under various forms.

Figure 3:
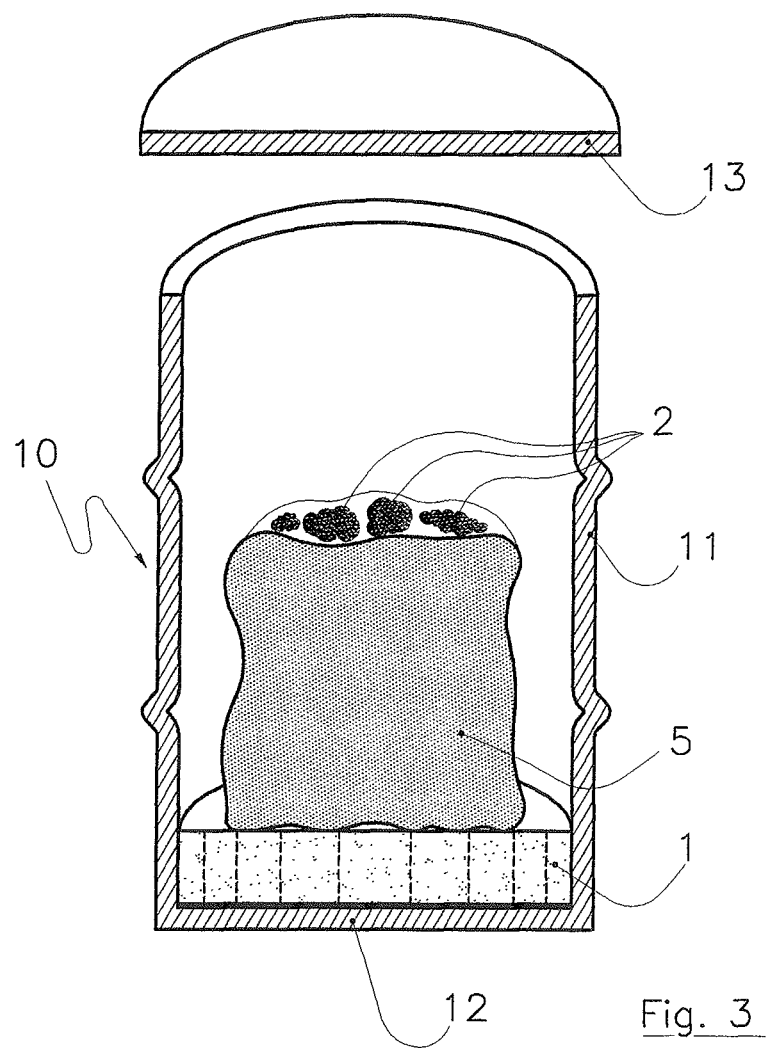
FIG. 3 illustrates an example of a device according to the invention in which a drum comprises a molecular sieve, tritiated waste and a mixture comprising manganese and silver oxides spread on the waste.

According to a first embodiment illustrated in FIG. 3, the tritiated waste 5 is placed in a drum 10. The drum 10 may be in various forms and in particular in the form of a cylinder having vertical walls 11, a bottom 12 and a lid 13. The drum 10 thus defines a housing being able to contain tritiated waste 5. Preferably, the molecular sieve 1 is placed at the bottom 12 of the drum 10. The waste 5 can then be placed at the bottom of the drum, at least partly covering the sieve 1. The mixture 2 comprising manganese dioxide and silver oxide is then deposited on the surface of the waste 5.

The combination of the drum 10, the molecular sieve 1 and the mixture of oxides 2 thus forms a self-contained device making it possible to accept radioactive waste and effectively and durably providing the trapping of tritiated hydrogen and tritiated water.

According to another embodiment, the mixture comprising manganese dioxide and silver oxide is deposited on the sieve. Preferably this deposition forms a single-piece assembly. It is then easy to handle. In this case, provision can be made for fixing the mixture 2 on the sieve 1 mechanically by stirring the species put in contact. Alternatively or accumulatively, this fixing can be provided or reinforced by means of an additive. It is possible for example to use water as an additive. Therefore this water is evaporated by drying the mixture of oxides between 150° and 200° C. for 12 h and 48 h. The mixture 2 thus forms a layer 3 partly covering at least the sieve 1. The sieve 1 is covered so as not to impair the dehumidification properties of the sieve 1.

The assembly formed by the molecular sieve associated with the mixture so as to form a single-piece assembly is in itself particularly advantageous since it can be put in contact with tritiated waste under varied forms and packages.

Figure 4:
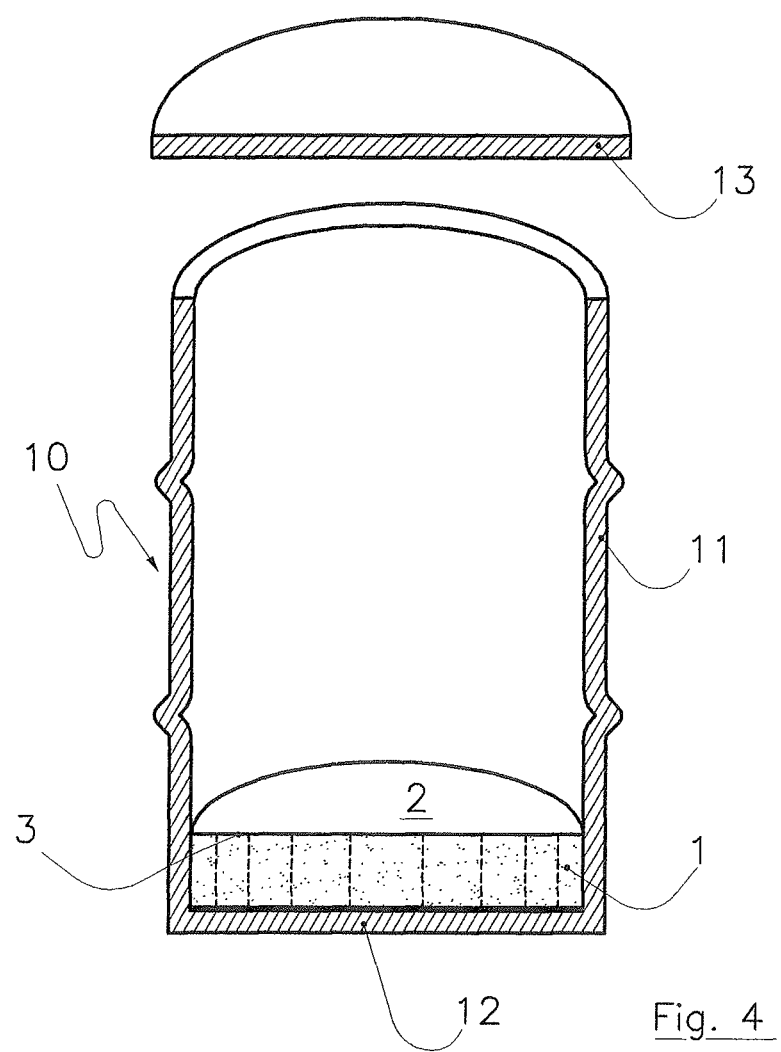
FIG. 4 illustrates another example of a device according to the invention in which a drum comprises a molecular sieve covered with a layer comprising a mixture of silver and manganese oxide.

According to a particular embodiment illustrated in FIG. 4, the assembly formed by the sieve 1 and mixture 2 is placed in a drum 10, for example at the bottom 12 of the drum 10. It then suffices to place the waste inside the drum 10 so that the trapping of tritiated hydrogen takes place along with the degassing.

According to another embodiment, the molecular sieve is placed at any point in the drum.

According to another embodiment, the radioactive waste is coated in a matrix. The package is thus formed from the matrix and waste. This matrix is for example made from cement, bitumen or glass. In this case, it is advantageous to fix the mixture comprising the manganese and silver oxides on a flexible structure such a metal mesh so as to form a cover for enclosing the waste. The cover is preferably flexible. Preferably, the molecular sieve is integrated to the cover.

According to the above description, it is clear that the invention affords an effective response to the problem of the degassing of tritiated hydrogen and tritiated water.

It is expected that, during the whole of its operating life as well as its dismantling period, a reactor of the ITER type will produce approximately 35,000 tons of radioactive waste. Among this waste, pure tritiated waste and very weakly radioactive waste will have to be placed directly in drums.

In order to comply with the storage constraints, the degassing of tritiated hydrogen should be around 0.1 milligrams per year and per drum.

Thus, with this theoretical degassing rate and even though the efficiency of the trapping of the tritiated hydrogen would be low (an efficiency of 0.3%), a single gram of mixture comprising manganese dioxide combined with silver oxide would be necessary. With a degassing rate of 0.1 milligrams per year and per drum, a molecular sieve of 120 g of zeolite per year and per $m^3$ of drum should also be sufficient to provide trapping of tritiated water present in the vapour state and in the form of liquid tritiated water. This relatively small quantity of materials representing the molecular sieve should also prove to be sufficient even with extreme conditions of heat (at least up to 40° C.) and humidity (at least 40%).

While the invention has been shown and described with reference to a certain embodiments thereof, it will be understood by those skilled in the art that various changes in form and detail may be made therein without departing from the spirit and scope of the invention as defined by the appended claims and their equivalents.

What is claimed is:

1. A method for reducing an amount of tritiated hydrogen ($T_2$ or HT) and/or tritiated water (HTO or $T_2O$) generated by at least one package including at least one piece of tritiated waste from the nuclear industry, the method comprising:
    placing the package in contact with a mixture including manganese dioxide ($MnO_2$) combined with a component comprising silver; and
    placing the package in contact with at least one molecular sieve.

2. The method according to claim 1, wherein the silver is in the mixture appearing as at least one of a silver oxide, a silver salt, and a silver complex.

3. The method according to claim 1, wherein the silver appears as silver oxide in the mixture, in which the mass concentration of manganese dioxide in the mixture ranging from 80% to 99%, and in which the mass concentration of silver oxide in the mixture is ranging from 20% to 1%.

4. The method according to claim 3, wherein the mass concentrations of manganese dioxide and silver oxide in the mixture are about 90% and 10%, respectively.

5. The method according to claim 1, wherein the mixture includes a platinum compound in which the mass concentration in the mixture is ranging from 0.1% to 1%.

6. The method according to claim 5, wherein the platinum compound is made of platinum black 10% Pt.

7. The method according to claim 5, wherein the silver appears as silver oxide in the mixture, in which the mass concentration of manganese dioxide in the mixture is around 89.3%, in which the mass concentration of silver is approximately 10.2% and in which the mass concentration of the platinum compound is approximately 0.5%.

8. The method according to claim 1, wherein the molecular sieve is a 4A-type or 5A-type zeolite.

9. The method according to claim 1, including, prior to the steps of placing the package in contact with the mixture and of placing the package in contact with a molecular sieve, depositing the mixture on the molecular sieve.

10. The method according to claim 9, wherein the step of depositing the mixture on the molecular sieve is followed by mechanically fixing the mixture onto the molecular sieve.

11. The method according to of claim 9, wherein the step of depositing the mixture on the molecular sieve is followed by chemically fixing the mixture onto the molecular sieve utilizing an additive.

12. The method according to claim 10, wherein the package is formed as a drum having a bottom and containing at least one piece of tritiated waste, and wherein the molecular sieve on which the mixture is fixed is placed inside the drum.

13. The method according to claim 1, wherein the package is formed as a drum having a bottom and containing at least one piece of tritiated waste, and wherein the molecular sieve is placed in the bottom of the drum and the mixture is deposited within the waste or onto the waste.

14. The method according to of claim 1, wherein the mixture is arranged at least partially on a flexible substrate in order to form a covering, and at least one portion of the package is surrounded by the covering.

15. The method according to claim 14, wherein the flexible substrate is a wire mesh.

16. The method according to claim 1, including, prior to the step of placing the package in contact with a mixture of manganese dioxide ($MnO_2$) combined with a compound comprising silver, preparing the mixture by combining the manganese dioxide ($MnO_2$) with a compound comprising silver (Ag).

17. The method according to claim 16, wherein, during the step of preparing the mixture, the silver is added as a silver oxide (AgO or $Ag_2O$) to the manganese dioxide ($MnO_2$).

18. The method according to claim 17, wherein the step of preparing the mixture includes a step of mixing a manganese dioxide powder with a silver oxide powder (AgO or $Ag_2O$).

19. The method according to claim 18, including, during the step of preparing the mixture and after the step of mixing the manganese dioxide powder with the silver oxide powder, a step of adding water to the mixed powders.

20. The method according to claim 16, wherein the step of preparing the mixture includes a step of spreading a saline solution including silver ions ($Ag^+$) on the manganese dioxide in solid state.

21. The method according to claim 16, wherein the step of preparing the mixture includes a step of submerging the manganese dioxide in solid state in a solution including a salt comprising silver.

22. The method according to claim 16, wherein the step of preparing the mixture includes a step of depositing silver on the manganese dioxide by a precipitation reaction of a solution including silver.

* * * * *